Jan. 10, 1928.

M. H. PADE 1,655,919

VULCANIZING APPARATUS

Filed April 24, 1920

Inventor

Max H. Pade

By A. L. Ely

Attorney

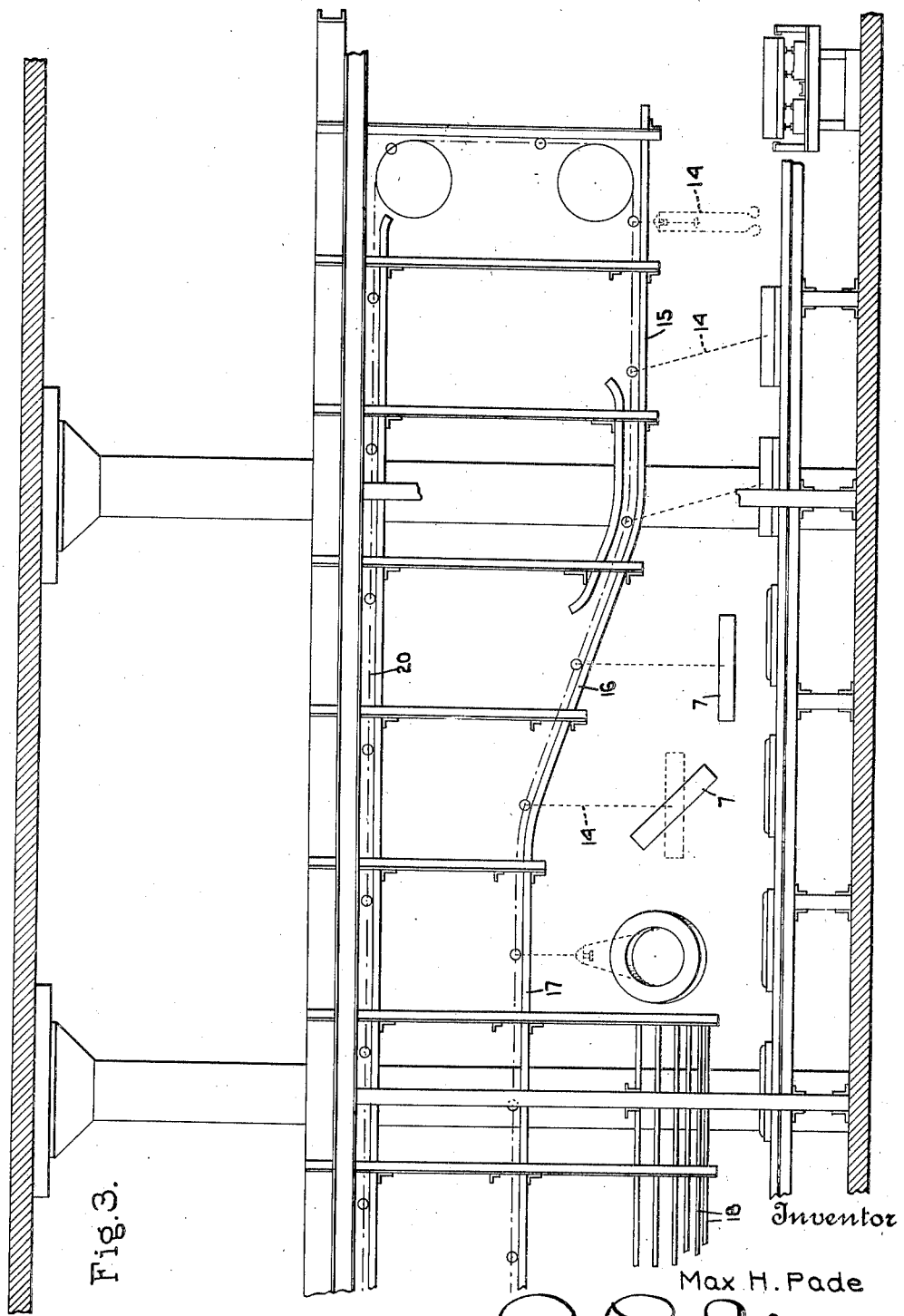

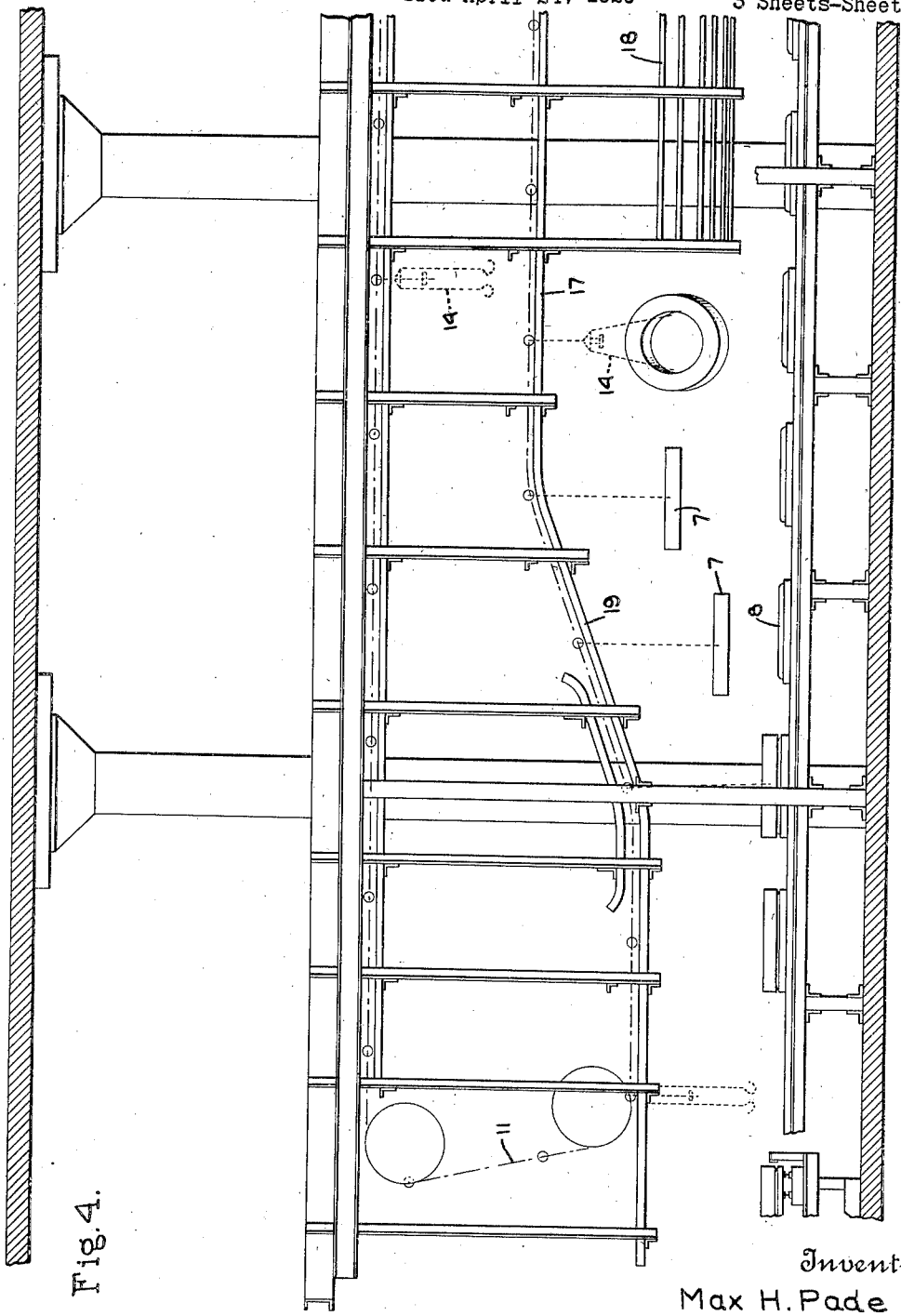

Patented Jan. 10, 1928.

1,655,919

UNITED STATES PATENT OFFICE.

MAX H. PADE, OF AKRON, OHIO, ASSIGNOR TO THE FIRESTONE TIRE AND RUBBER COMPANY, OF AKRON, OHIO, A CORPORATION OF OHIO.

VULCANIZING APPARATUS.

Application filed April 24, 1920. Serial No. 376,399.

This invention relates to apparatus for use in the vulcanization of rubber articles, particularly automobile tires, and is designed to facilitate the production of tires, so that a large number may be cured with minimum equipment and floor space.

The apparatus constituting the subject matter of this invention is intended to provide a continuous stream of tire molds into and out of the several vulcanizers so that as near to a continuous process can be obtained as is possible under the circumstances. I am aware that prior to my invention there has been in use apparatus for transferring molds to and from the vulcanizing presses and opening and closing them while in motion, but such apparatus has occupied considerable floor space and has not realized fully the benefit of the conveying apparatus. By my invention it is possible to supply a larger number of vulcanizers than is possible with other systems in use. Greater economy of floor space is obtained and the efficiency of the machinery is increased.

In the drawings:

Figs. 3 and 4 are side elevations, the latter figure being a continuation of the former.

The apparatus is designed as a conveyor mechanism for supplying molds to a plurality of vulcanizers and removing the molds having the cured tires therein. The molds are then opened on the conveyor, the cured tires removed and green or uncured tires placed in the molds, which are closed and moved to a vulcanizer which is being filled.

Figure 1:
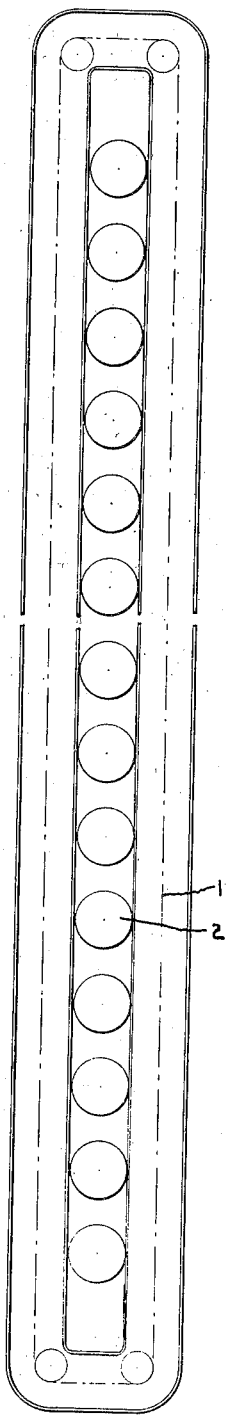
Fig. 1 is a plan of a complete vulcanizing system.

In the drawings the lay-out of the apparatus is shown in Fig. 1 in which 1 represents the conveyor, while 2 represents the vulcanizers or presses. The presses are of any type, the preferred form being of the type known as vertical presses, and arranged in a row as close together as it is possible to place them, any suitable number being so placed. It has been found that as many as twenty-two vulcanizers can be arranged in the row without interference and obtaining the maximum efficiency in the apparatus.

In conveyor systems of this general type in use heretofore, it has been customary to provide a portion of the conveyor system remote from the vulcanizers on which the opening and emptying and refilling of the mold is carried on, while at the vulcanizers the filling of the vulcanizers has been done from one side and the emptying from the other. I have found that such an arrangement is not essential and that the conveyor may closely enclose the row of vulcanizers, the apparatus for opening and closing the mold being on one side of the row of vulcanizers while the molds are loaded and unloaded from the vulcanizers at the other side of the row of presses.

Each vulcanizer 2 is provided with the usual lid or top 3, designed to be raised and lowered by any suitable mechanism, not shown. The molds are carried around on the conveyor and guided by side rails 4, the rails being continuous, except on one side of the conveyor adjacent the row of presses, at which point it is interrupted sufficiently to permit the molds to be slid transversely off the conveyor into the several vulcanizers.

The molds are indicated by the numerals 5, the bottom half being shown at 6 and the top half at 7. The core and tire are indicated by the numeral 8.

The main conveyor is supported by a framework 9 and above the mold emptying and filling side of the conveyor is arranged a framework 10 which supports the mold lid lifting apparatus. The lid lifting device comprises a chain 11, moving at the same speed as the conveyor, supported on rails 12 from which are suspended, at intervals corresponding to the spacing of the molds on the lower conveyor, a number of hangers 13 from which depend chains 14 designed to engage the mold top.

As shown in Figs. 3 and 4 the lid conveyor 11 comprises a horizontal portion 15 which parallels the main conveyor at a distance sufficient to enable the chains 14 to be fastened to the mold top. At 16 the conveyor is led upwardly at an incline in order that the top, which is secured to the chains, may be lifted to allow the cured tire to be removed from the mold. At 17 the conveyor runs on a parallel stretch above the main conveyor for a distance sufficient to enable the mold to be cleaned and a new uncured tire to be placed in the mold. For cleaning the lid of the mold it is tilted in the position shown in Fig. 4 and during its travel in elevation it passes above a shield or cage 18 which insures against accidental dropping of the mold lid. Beyond, the track is inclined downwardly, as at 19, which lowers the lid on the mold. When the lid has registered with the lower half of the mold, the chains 14 are released and the continued movement of the conveyor lifts them up and brings them back to the starting point traveling over a return section of the conveyor 20.

Figure 2:
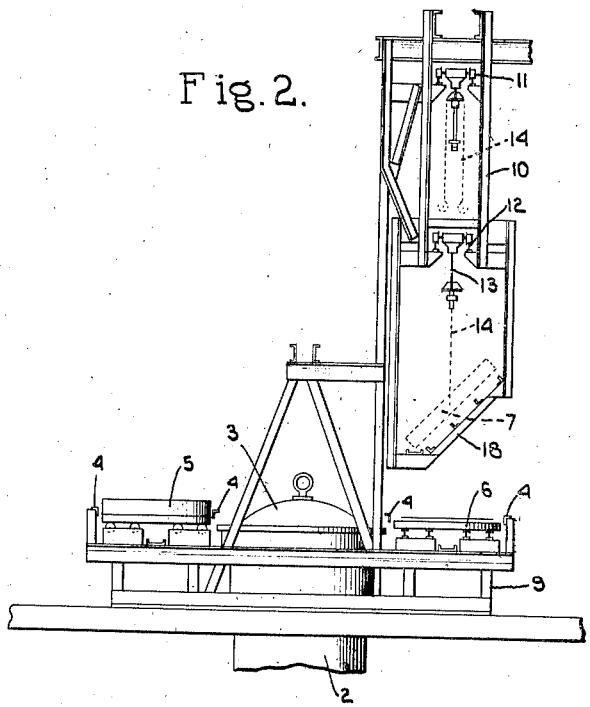
Fig. 2 is an end elevation.

As shown in Fig. 2, the lid lifting mechanism is located on one side of the row of vulcanizers, leaving the opposite side free for the operation of loading and unloading the vulcanizers. In the operation of the apparatus the number of vulcanizers and their capacity is so related to the time of vulcanization that one vulcanizer is being filled and one being emptied at all times. The molds to fill each vulcanizer, loaded with uncured tires, are shoved transversely into the vulcanizer which is being filled, while molds containing cured tires are moved from the vulcanizer onto the conveyor.

It is obvious that various methods may be devised for carrying out the principles of this invention which may vary in detail and proportions from the showing of this application, but it will be understood that the claims are intended to be broad enough to cover modifications and alterations falling within the scope of the invention. It is considered by me to be a new and distinct advance in the art to construct a tire mold conveying apparatus in combination with a row of vulcanizers in such manner that all of the loading and unloading of the vulcanizers is done on one side of the row while the mold emptying and refilling is done on the other. By this improved apparatus the greatest number of molds may be handled at one time and the maximum production is obtained, also the floor space is reduced and the number of operators required is much less than in prior devices of this type.

I claim:

1. In an apparatus for vulcanizing tires, the combination of a plurality of vulcanizers arranged in a row, conveyor mechanism surrounding the vulcanizers, means at one side of said row of vulcanizers for raising and lowering the mold lids while moving on said conveyor, said molds being loaded and unloaded into the vulcanizers from the conveyor on the opposite side from the lid raising apparatus.

2. In an apparatus for vulcanizing, the combination of a plurality of open top vulcanizing presses, said presses being arranged in a row, a conveyor surrounding said row of presses, a plurality of molds carried on said conveyor and adapted to be loaded into and removed from the presses at one side of the row, and mold lifting apparatus on the opposite side of said conveyor.

MAX H. PADE.